INVENTORS.
DAVID L. BAHRS
JOHN F. COULEUR
PHILIP F. GUDENSCHWAGER
RICHARD L. RUTH
DONALD L. SHELL
WILLIAM A. SHELLY
BY
ATTORNEY

United States Patent Office 3,454,932

Patented July 8, 1969

3,454,932

DATA PROCESSING SYSTEM EMPLOYING INDIRECT ADDRESSING APPARATUS

David L. Bahrs, Liverpool, N.Y., and John F. Couleur, Phoenix, Philip F. Gudenschwager, Scottsdale, and Richard L. Ruth, Phoenix, Ariz., Donald L. Shell, Schenectady, N.Y., and William A. Shelly, Phoenix, Ariz., assignors to General Electric Company, a corporation of New York

Filed June 27, 1966, Ser. No. 560,666
Int. Cl. G11b *13/00;* G06f *1/00, 7/00*
U.S. Cl. 340—172.5 12 Claims

ABSTRACT OF THE DISCLOSURE

A data processing system including a data processor and a memory unit is shown. The processor includes a means for providing several different types of address modifications.

Figure 1:
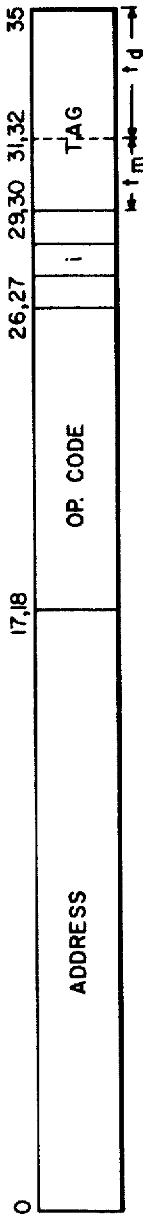

This invention relates generally to data processing systems and, more particularly, to means for providing memory addresses in a data processing system.

In a data processing system which executes a sequence of instruction words called a program to process data, it is often desirable to provide the capability of what is generally referred to as indirect addressing. More correctly, it is desirable to provide for address modification which includes indirect addressing. In address modification, an instruction word, which normally includes an address portion as well as additional data concerning an operation to be performed, is operatively employed with a second type of information item termed an indirect word. These two words, the instruction word and the indirect word, collectively define the total of an operation to be performed with respect to an information item stored in the memory. This latter information item is normally called an operand.

Address modification permits versatility and flexibility in establishing programs for a data processing system and greatly eases the problems of the programmer. Address modification also facilitates the use of certain fundamental concepts by more than one programmer without the inclusion of a great number of details in each of the programs. Additionally, certain types of address modifications permit the traversal of tables (a series of storage locations) by the execution of a single command without the necessity of programmer supervision of each individual step to thus permit what amounts to an automatic search for a specific detail or information item.

Without address modification it is necessary for the programmer to use what is sometimes termed an impure procedure. In an impure procedure, the programmer must modify each instruction used. This prohibits, in a multiprocessor system, the use of a single instruction by more than one program. Thus, an impure procedure does not represent an efficient method of programming. Additionally, by address modification a particular memory location may be preselected which will serve to point to a particular type of function. With this knowledge the programmer may proceed to write his program knowing that when he needs this particular type of function he need only reference this preselected location.

While address modification is fairly well developed in the art it has suffered from lack of versatility in the number of ways of developing addresses. Accordingly, it is desirable to extend the usefulness of address modification in a data processing system.

It is, therefore, an object of the present invention to provide an improved address modification apparatus in a data processing system.

It is another object to extend the address modification capability of a data processing system.

It is a still further object to provide a data processing system embodying new and improved means for address development.

Still another object is to provide a data processing system employing address modification apparatus to ensure greater versatility to the program.

It is a still further object of the present invention to provide a data processing system employing address modification apparatus which permits the modification of the address of a second information item in accordance with the directions provided by a first information item.

The foregoing objects are achieved, in accordance with the illustrated embodiment of the present invention by providing an instruction word which includes an address portion and a tag portion. This instruction word is utilized to obtain a second or indirect word which is brought from the memory unit to the data processing unit of the system. The indirect word also includes an address portion. The address portion of this indirect word may then be modified in accordance with the directions of the tag portion of the first instruction word to obtain a modified address which is then used in a subsequent accessing of the memory unit to obtain an information item. This information item may be the operand.

*Drawings*

Figure 2:
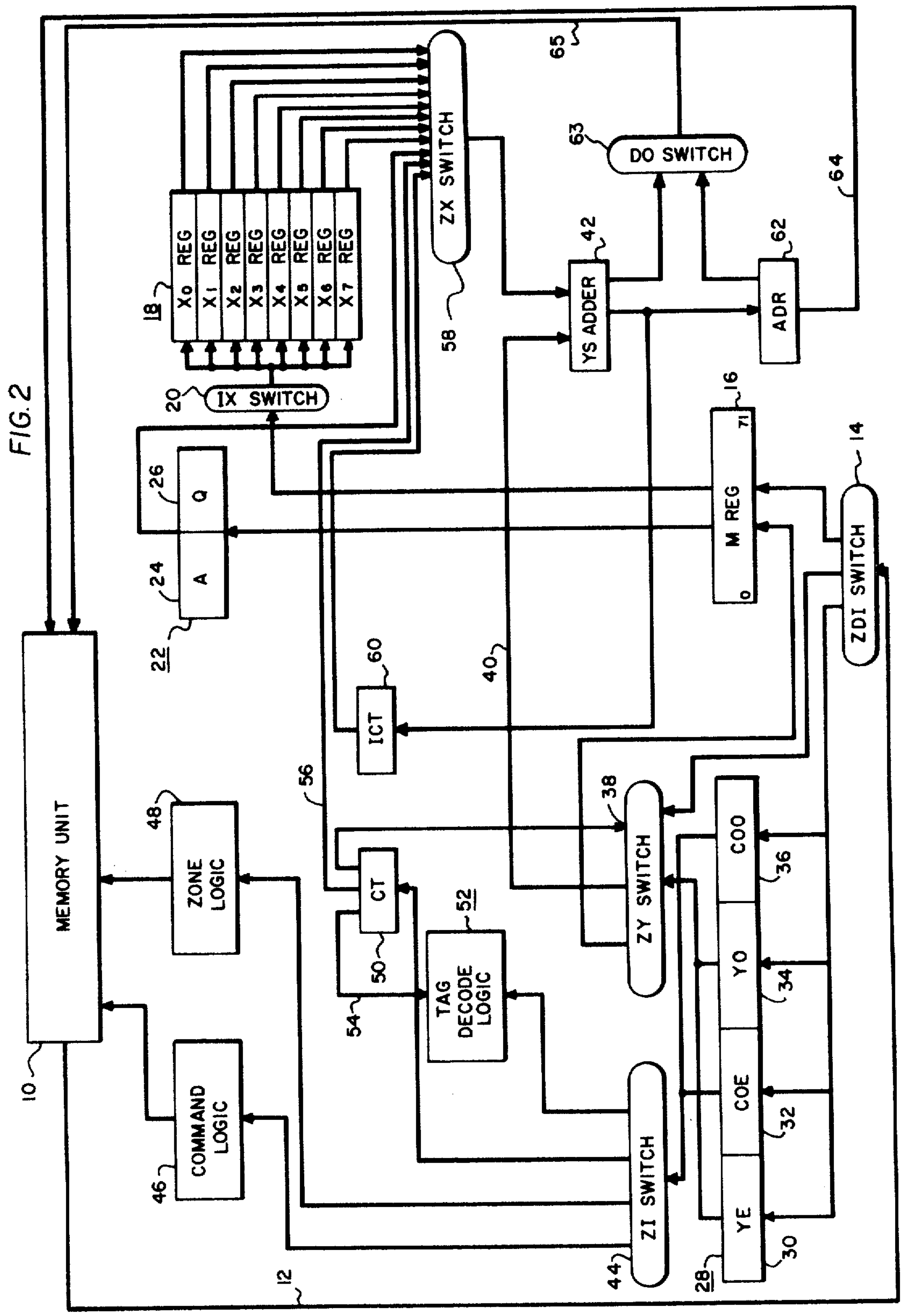

For a better understanding of the invention, reference is made to the accompanying drawings in which:

FIGURE 1 illustrates the format of a typical instruction word used in the present invention; and FIGURE 2 is a major block diagram illustrating the data paths in the system of the present invention.

For a complete description of the system illustrated in FIGURES 1 and 2 and of our invention, reference is made to United States Patent No. 3,425,039, issued to David L. Bahrs et al. on Jan. 28, 1969, and assigned to the assignee of the present invention. More particularly, attention is directed to FIGURES 3 through 20 and to the specification beginning at column 2, line 42, and ending at column 25, line 56, inclusive, of United States Patent No. 3,425,039 which are incorporated herein by reference and made a part hereof as if fully set fourth herein.

What is claimed is:

1. In a data processing system, the combination comprising: a memory unit having a plurality of addressable storage locations, a portion of said storage locations containing instruction words, each of said instruction words including an address portion; means for bringing a first instruction word from said memory unit, said first instruction also including a tag portion, said tag portion defining a modification to be performed to the address portion of an instruction word; storage means for storing the tag portion of said first instruction word; means responsive to the address portion of said first instruction word for bringing a second instruction word from said memory unit; and means responsive to said stored tag portion to effect said modification to the address portion of said second instruction words, said latter address portion, when modified, constituting an address to be utilized for a subsequent accessing of said memory unit.

2. In a data processing system, the combination comprising: a memory unit having a plurality of addressable storage locations, a portion of said storage locations containing instruction words, each of said instruction words including an address portion; means for bringing a first instruction word from said memory unit, said first instruction also including a tag portion, said tag portion defining a modification to be performed to the address portion of an instruction word; storage means responsive to said tag portion for storing said tag portion of said first instruction word; means responsive to the address portion of said first instruction word for bringing a second instruction word from said memory unit; and means responsive to said stored tag portion to effect said modification to the address portion of said second instruction word; said latter address portion, when modified, constituting an address to be utilized for a subsequent accessing of said memory unit.

3. In a data processing system, the combination comprising: a memory unit having a plurality of addressable storage locations, predetermined ones of said storage locations containing instruction words, each of said instruction words including an address portion, means for retrieving a first instruction word from said memory unit, said first instruction also including a tag portion defining a modification to be performed to the address portion of an instruction word; storage means for storing the tag portion of said first instruction word; means responsive to the address portion of said first instruction word to retrieve a second instruction word from said memory unit; and means responsive to said stored tag portion to effect the modification, defined by said stored tag portion, to the address portion of said second instruction word; latter address portion, when modified, constituting an address to be utilized for a subsequent accessing of said memory unit.

4. In a data processing system, the combination comprising: a memory unit having a plurality of addressable storage locations, predetermined ones of said storage locations containing instruction words, each of said instruction words including an address portion; a data processing unit; means for bringing a first instruction word from said memory unit to said data processing unit, said first instruction also including a tag portion defining a modification to be performed to the address portion of an instruction word; a storage means included within said data processing unit for storing the tag portion of said first instruction word; means responsive to the address portion of said first instruction word for bringing a second instruction word from said memory unit; and means, included within said data processing unit and responsive to said stored tag portion, for effecting the modification to said address portion of the second instruction word defined by said stored tag portion; said latter address portion, when modified, constituting an address to be utilized for a subsequent accessing of said memory unit.

5. In a data processing system, the combination comprising: a memory unit having a plurality of addressable storage locations, a portion of said storage locations containing instruction words, each of said instruction words including an address portion and a tag portion, said tag portion directing a modification to be performed to the address portion of an instruction word; means for retireving a first instruction word from said memory unit; means for storing the tag portion of said first instruction word; means responsive to the address portion of said first instruction word for retrieving a second instruction word from said memory unit; and means responsive to said stored tag portion to effect said modification of said address portion of said second instruction word; said latter address portion, when modified, in accordance with the direction of said tag portion of said first instruction word, constituting an address to be utilized for a subsequent accessing of said memory unit.

6. In a data processing system, the combination comprising: a memory unit having a plurality of addressable storage locations, a portion of said storage locations containing instruction words, each of said instruction words including an address portion and a tag portion, said tag portion directing a modification to be performed to the address portion of an instruction word; a data processing unit; means for bringing a first instruction word from said memory unit to said data processing unit; said data processing unit including means responsive to the tag portion of said first instruction word for storing the tag portion of said first instruction word; means responsive to the address portion of said first instruction word to bring a second instruction word from said memory unit; and additional means within said data processing unit responsive to said stored tag portion to effect the modification to said address portion of said second instruction word defined by said stored tag portion; said latter address portion, when modified in accordance with the direction of said tag portion, constituting an address to be utilized for a subsequent accessing of said memory unit.

7. In a data processing system, the combination comprising: a memory unit having a plurality of addressable storage locations, predetermined ones of said storage locations containing instruction words, each of said instruction words including an address portion and a tag portion, said tag portion directing a modification to be performed to the address portion of an instruction word; a data processing unit; means for bringing a first instruction word from said memory unit to said data processing unit, said data processing unit including means responsive to the tag portion of said first instruction word for the temporary storage thereof; means responsive to the address portion of said first instruction word for bringing a second instruction word from said memory unit to said data processing uint; and additional means within said data processing unit, responsive to said stored tag portion, to effect said modification of said address portion of said second instruction word, said latter address portion, when modified, constituting an address to be utilized for a subsequent accessing of said memory unit.

8. In a data processing system, the combination comprising: a memory unit having a plurality of addressable storage locations, a portion of said storage locations containing instruction words, each of said instruction words including an address portion and a tag portion, said tag portion directing a modification to be performed to the address portion of an instruction word; a data processing unit; means for bringing a first instruction word from said memory unit to said data processing unit; storage means within said data processing unit for storing the tag portion of said first instruction word; means responsive to the address portion of said first instruction word for bringing a second instruction word from said memory unit; and further means, within said data processing unit and responsive to the tag portion of said second instruction word, to effect the modification of said address portion of said second instruction word in accordance with the direction of the stored tag portion of said first instruction word, said latter address portion, when thus modified, constituting an address to be utilized for a subsequent accessing of said memory unit.

9. In a data processing system, the combination comprising: a memory unit having a plurality of addressable storage locations, predetermined ones of said storage locations containing instruction words, each of said instruction words including an address portion; a data processing unit; means for bringing a first instruction word from said memory unit to said data processing unit; said first instruction word including a tag portion defining an operation to be executed upon the address portion of an instruction word; means for the storage of the tag portion of said first instruction word; means responsive to the address portion of said first instruction word to retrieve a second instruction word from said memory unit and means responsive to said stored tag portion to effect said operation upon said address portion of said second instruction word to thereby develop an address to be utilized in a subsequent accessing of said memory unit.

10. In a data processing system, the combination comprising: a data processing unit including a plurality of indexing registers; a memory unit having a plurality of addressable storage locations, a portion of said storage locations containing instruction words; means for bringing a first instruction word from said memory unit to said data processing unit, said first instruction word including an address portion and a tag portion, said tag portion defining a modification to be performed to the address portion of an instruction word by the specification of one of said indexing registers; means within said data processing unit including a register for storing the tag portion of said first instruction word; means responsive to the address portion of said first instruction word for bringing a second instruction word from said memory unit to said data processing unit, said second instruction word including an address portion and a tag portion; an adder; first switching means for transferring the address portion of said second instruction word to said adder; additional switching means responsive to the tag portion of said second instruction word for transferring the contents of the indexing register specified by said stored tag portion of said first instruction word to said adder whereby said contents are added to the address portion of said second instruction word to thereby form a modified address, said modified address constituting an address to be utilized for a subsequent accessing of said memory unit.

11. In a data processing system of the type employing a memory unit capable of storing a plurality of instruction words each of which contains an address portion, a data processing unit for selectively acting upon ones of said instruction words brought from said memory unit, and means interconnecting said memory and data processing units, the improvement comprising: means for selectively bringing a first instruction word from said memory unit to said data processing unit, said first instruction word also including a tag portion, said tag portion defining a modification to be effected upon the address portion of an instruction word; means responsive to said tag portion for the storage thereof; means responsive to the address portion of said first instruction word for bringing a second instruction word from said memory unit to said data processing unit; and means responsive to said stored tag portion to effect the modification, defined by said stored tag portion, of said address portion of said second instruction word to provide a modified address to be utilized for subsequent accessing of said memory unit.

12. In a data processing system of the type employing a memory unit capable of storing a plurality of instruction words each of which contains an address portion, a data processing unit for selectively acting upon instruction words brought from said memory unit, and means interconnecting said memory and data processing units, the improvement comprising: means for selectively bringing a first instruction word from said memory unit to said data processing unit, said first instruction word also including a tag portion, said tag portion defining a modification to be effected upon the address portion of an instruction word; means responsive to said tag portion for the storage thereof; means responsive to the address portion of said first instruction word for bringing a second instruction word from said memory unit; and means responsive to the tag portion of said second instruction word to effect the modification of said address portion of said second instruction word in accordance with the direction of the stored tag portion of said first instruction word, said latter address portion, when modified, constituting an address to be utilized for a subsequent accessing for said memory unit.

No references cited.

PAUL J. HENON, *Primary Examiner.*

I. S. KAVRUKOV, *Assistant Examiner.*